(12) United States Patent
McMinn et al.

(10) Patent No.: US 7,043,626 B1
(45) Date of Patent: May 9, 2006

(54) RETAINING FLAG VALUE ASSOCIATED WITH DEAD RESULT DATA IN FREED RENAME PHYSICAL REGISTER WITH AN INDICATOR TO SELECT SET-ASIDE REGISTER INSTEAD FOR RENAMING

(75) Inventors: Brian D. McMinn, Buda, TX (US); James K. Pickett, Austin, TX (US); Mitchell Alsup, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 427 days.

(21) Appl. No.: 10/676,636

(22) Filed: Oct. 1, 2003

(51) Int. Cl.
*G06F 9/38* (2006.01)

(52) U.S. Cl. .................. 712/217; 712/216; 712/218

(58) Field of Classification Search ............... None
See application file for complete search history.

(56) References Cited

U.S. PATENT DOCUMENTS

| | | | |
|---|---|---|---|
| 4,916,652 A | 4/1990 | Schwarz et al. | 708/510 |
| 5,179,702 A | 1/1993 | Spix | 718/102 |
| 5,233,696 A | 8/1993 | Suzuki | 712/204 |
| 5,345,569 A | 9/1994 | Tran | 712/217 |
| 5,408,609 A | 4/1995 | Molgogne et al. | 709/228 |
| 5,463,745 A | 10/1995 | Vidwans et al. | 712/218 |
| 5,574,935 A | 11/1996 | Vidwans et al. | 712/23 |
| 5,623,628 A | 4/1997 | Brayton et al. | 711/141 |
| 5,630,149 A | 5/1997 | Bluhm | 712/217 |
| 5,632,023 A | 5/1997 | White et al. | 712/218 |
| 5,651,125 A | 7/1997 | Witt et al. | 712/218 |
| 5,696,955 A | 12/1997 | Goddard et al. | 712/222 |
| 5,768,610 A | 6/1998 | Pflum | 712/23 |
| 5,784,589 A | 7/1998 | Bluhm | 712/217 |
| 5,805,853 A | 9/1998 | White et al. | 712/218 |
| 5,857,089 A | 1/1999 | Goddard et al. | 712/222 |
| 5,872,949 A | 2/1999 | Kikuta et al. | 712/216 |
| 5,878,244 A | 3/1999 | Witt et al. | 712/218 |

(Continued)

FOREIGN PATENT DOCUMENTS

EP       0 518 469       12/1992

(Continued)

OTHER PUBLICATIONS

Val Popescu, et al., "The Metaflow Architecture", IEEE Micro, Jun. 1991, 15 pages.

*Primary Examiner*—Kenneth S. Kim
(74) *Attorney, Agent, or Firm*—Lawrence J. Merkel; Meyertons, Hood, Kivlin, Kowert & Goetzel, P.C.; Erik A. Heter

(57) ABSTRACT

A method and apparatus for retaining flag values when an associated data value dies. A first storage circuit includes a free list for storing physical register names (PRNs) and indications indicative of whether a physical register associated with a PRN was assigned to store a logical register result and flag results of a first instruction and a logical register result and a subsequent instruction which overwrites the logical register result but not the flags. A second storage circuit stores PRNs separate from the free list. The first and second storage circuits output first and second PRNs to a selection circuit. If the first indication (associated with the first PRN) is in a first state, the selection circuit may provide the first PRN to a mapper for assignment to a logical register. If the first indication is in a second state, the second PRN may be provided to the mapper.

16 Claims, 6 Drawing Sheets

U.S. PATENT DOCUMENTS

| | | | |
|---|---|---|---|
| 5,884,059 A | 3/1999 | Favor et al. | 712/215 |
| 5,892,936 A | 4/1999 | Tran | 712/216 |
| 5,933,618 A | 8/1999 | Tran | 712/217 |
| 5,946,468 A | 8/1999 | Witt et al. | 712/218 |
| 5,951,670 A | 9/1999 | Glew et al. | 712/23 |
| 5,978,901 A | 11/1999 | Luedtke | 712/222 |
| 5,987,592 A | 11/1999 | Mahalingaiah | 712/200 |
| 6,047,369 A * | 4/2000 | Colwell et al. | 712/217 |
| 6,061,786 A | 5/2000 | Witt | 712/237 |
| 6,094,716 A | 7/2000 | Witt | 712/23 |
| 6,098,167 A | 8/2000 | Cheong et al. | 712/218 |
| 6,119,223 A | 9/2000 | Witt | 712/244 |
| 6,122,656 A | 9/2000 | Witt | 718/100 |
| 6,230,262 B1 | 5/2001 | Witt | 712/244 |
| 6,240,503 B1 | 5/2001 | Witt | 712/23 |
| 6,247,117 B1 | 6/2001 | Juffa | 712/222 |
| 6,256,721 B1 | 7/2001 | Witt | 712/23 |
| 6,266,763 B1 | 7/2001 | Witt et al. | 712/36 |
| 6,374,345 B1 | 4/2002 | Juffa et al. | 712/220 |
| 6,393,546 B1 | 5/2002 | Witt et al. | 712/36 |
| 6,393,555 B1 | 5/2002 | Meier et al. | 712/222 |
| 6,408,379 B1 | 6/2002 | Juffa et al. | 712/222 |
| 6,425,072 B1 | 7/2002 | Meier et al. | 712/218 |
| 6,442,677 B1 | 8/2002 | Meyer et al. | 712/216 |
| 6,487,653 B1 | 11/2002 | Oberman et al. | 712/222 |

FOREIGN PATENT DOCUMENTS

| | | |
|---|---|---|
| EP | 0 851 343 | 7/1998 |

* cited by examiner

RETAINING FLAG VALUE ASSOCIATED WITH DEAD RESULT DATA IN FREED RENAME PHYSICAL REGISTER WITH AN INDICATOR TO SELECT SET-ASIDE REGISTER INSTEAD FOR RENAMING

BACKGROUND OF THE INVENTION

1. Field of the Invention

This invention is related to the field of microprocessors, and more particularly, the handling of flag values during the speculative execution of instructions.

2. Description of the Related Art

High performance microprocessors use various techniques to speed up the execution of instructions, including the speculative/out-of-order execution of instructions. Since speculatively executed instructions may update the registers in a microprocessor, a means for storing speculative results that may be written to the logical (architected) registers may be implemented.

Register renaming is a technique used to keep track of speculative results that may be intended to be written to the logical registers. A microprocessor employing register renaming may include a physical register file which may store several copies of results intended for the logical registers. Each logical register may be associated with speculative results stored in a number of physical registers, as well as one non-speculative result stored in a physical register. This may allow several speculative results to be stored for each logical register, and may further allow for instructions to be executed out of order without concern for overwriting various results before they are no longer needed.

Although register renaming may allow instructions to be executed out of order without overwriting older register results, other hazards may be present. One such hazard involves the flag bits (e.g., carry, overflow, etc.). Some instructions, when executed, may update both the logical register results and one or more of the flag bits, while other instructions may update logical register results without updating flag bits.

In some cases, an instruction may be executed which updates both a logical register and a flag value, followed by the execution of a subsequent instruction which updates the same logical register without any corresponding updates of the flag values. Only the most recent value of the logical register may be considered valid, while the previous value may be considered dead, or invalid. However, the flag values, which were updated with the previous instruction (associated with the now-dead register value) may still be valid since the most recent instruction did not update the flag values. Thus, any future references to the flags shall receive the flags generated by executing the previous instruction. If the same physical register stores both a logical register value and a flags value, the above situation may complicate the freeing of physical registers in the register renaming mechanism.

SUMMARY OF THE INVENTION

A method and apparatus for retaining flag values when an associated data value dies is disclosed. In one embodiment, a first storage circuit includes a free list configured to store a list of physical register names and a set of indications. The indications are indicative of whether or not a physical register associated with a physical register name was assigned to store a logical register result and flag results of a first instruction and another physical register was assigned to store a logical register result of a subsequent instruction that overwrites the logical register result but not the flags. A second storage circuit is configured to store one or more physical register names separate from the free list. The first and second storage circuits are configured to output first and second physical register names, respectively, to a selection circuit. A first indication associated with the first register name may also be received by the selection circuit. If the first indication is in a first state, the selection circuit may provide the first register name to a mapper for assignment to a logical register. If the first indication is in a second state, the second physical register name may be provided to the mapper.

BRIEF DESCRIPTION OF THE DRAWINGS

Other aspects of the invention will become apparent upon reading the following detailed description and upon reference to the accompanying drawings in which.

Figure 1:
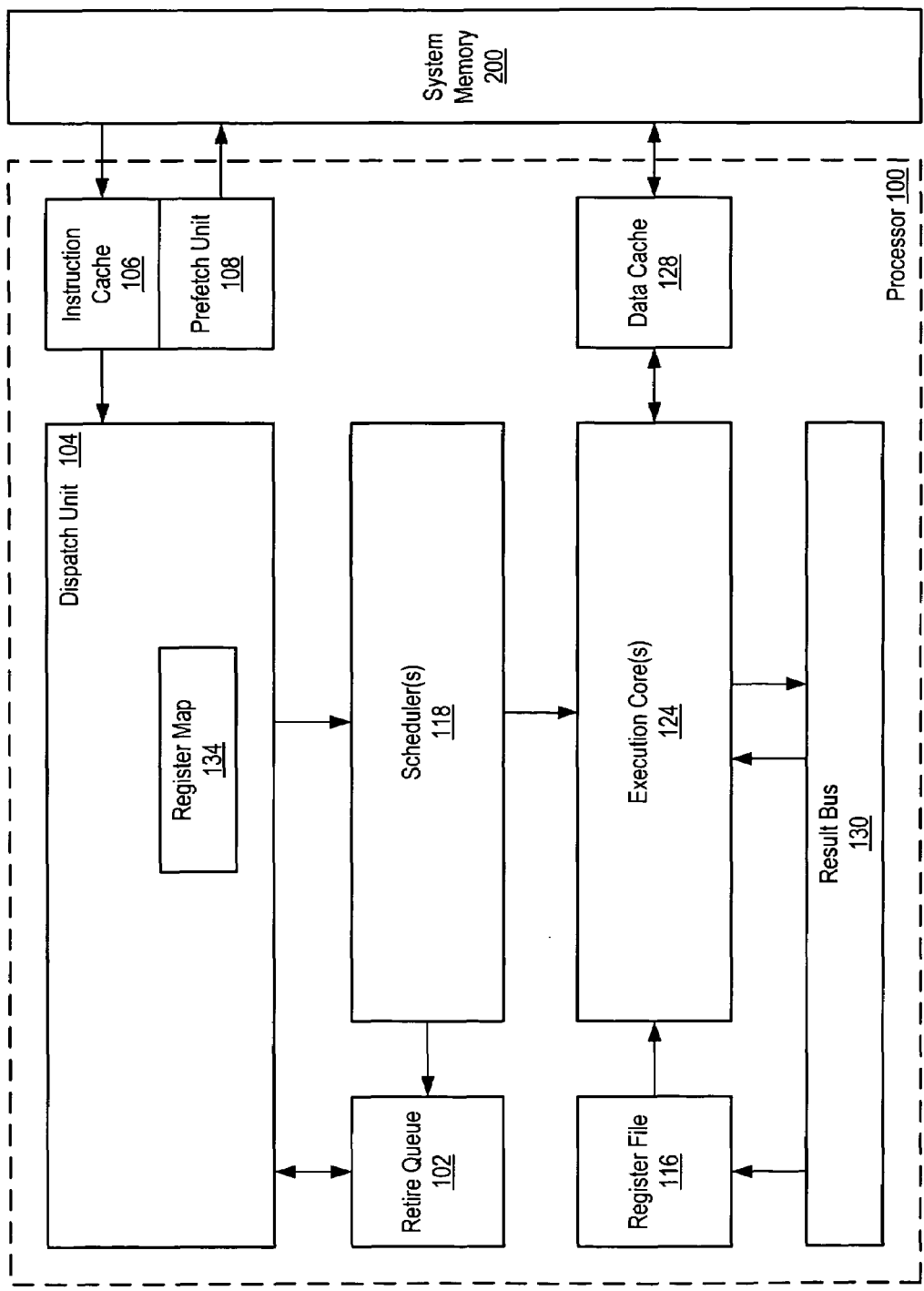
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION

Processor Overview

FIG. 1 is a block diagram of one embodiment of a processor 100. The processor 100 is configured to execute instructions stored in a system memory 200. Many of these instructions operate on data stored in the system memory 200. It is noted that the system memory 200 may be physically distributed throughout a computer system and/or may be accessed by one or more processors 100.

In the illustrated embodiment, the processor 100 may include an instruction cache 106 and a data cache 128. The processor 100 may include a prefetch unit 108 coupled to the instruction cache 106. A dispatch unit 104 may be configured to receive instructions from the instruction cache 106 and to dispatch operations to the scheduler(s) 118. One or more of the schedulers 118 may be coupled to receive dispatched operations from the dispatch unit 104 and to issue operations to the one or more execution cores 34. The execution core(s) 124 may include one or more integer units, one or more floating point units, and one or more load/store units. Results generated by the execution core(s) 124 may be output to one or more results bus 130 (a single results bus is shown here for clarity; embodiments having multiple results buses are possible and contemplated). These results may be used as operand values for subsequently issued instructions and/or stored to the register file 116. A retire queue 102 may be coupled to the scheduler(s) 118 and the dispatch unit 104. The retire queue 102 may be configured to determine when each issued operation may be retired. In one embodiment, the processor 100 may be designed to be compatible with the x86 architecture (also known as the Intel Architecture-32, or IA-32). Note that the processor 100 may also include many other components. For example, the processor 100 may include a branch prediction unit (not shown).

The instruction cache 106 may store instructions for fetch by the dispatch unit 104. Instruction code may be provided to the instruction cache 106 for storage by prefetching code from the system memory 200 through the prefetch unit 108. Instruction cache 106 may be implemented in various configurations (e.g., set-associative, fully-associative, or direct-mapped).

The prefetch unit 108 may prefetch instruction code from the system memory 200 for storage within the instruction cache 106. The prefetch unit 108 may employ a variety of specific code prefetching techniques and algorithms.

The dispatch unit 104 may output operations executable by the execution core(s) 124 as well as operand address information, immediate data and/or displacement data. In some embodiments, the dispatch unit 104 may include decoding circuitry (not shown) for decoding certain instructions into operations executable within the execution core(s) 124. Simple instructions may correspond to a single operation. In some embodiments, more complex instructions may correspond to multiple operations. Upon decode of an operation that involves the update of a register, a register location within register file 116 may be reserved to store speculative register states. A register map 134 may translate logical register names of source and destination operands to physical register names in order to facilitate register renaming. The register map 134 may track which registers within the register file 116 are currently allocated and unallocated.

The processor 100 of FIG. 1 supports out of order execution. The retire queue 102 may keep track of the original program sequence for register read and write operations, allow for speculative instruction execution and branch misprediction recovery, and facilitate precise exceptions. In some embodiments, the retire queue 102 may also support register renaming by providing data value storage for speculative register states (e.g. similar to a reorder buffer). In other embodiments, the retire queue 102 may function similarly to a reorder buffer but may not provide any data value storage. As operations are retired, the retire queue 102 may deallocate registers in the register file 116 that are no longer needed to store speculative register states and provide signals to the register map 134 indicating which registers are currently free. By maintaining speculative register states within the register file 116 until the operations that generated those states are validated, the results of speculatively-executed operations along a mispredicted path may be invalidated in the register file 116 if a branch prediction is incorrect.

In one embodiment, a given register of register file 116 may be configured to store a data result of an executed instruction and may also store one or more flag bits that may be updated by the executed instruction. Flag bits may convey various types of information that may be important in executing subsequent instructions (e.g. indicating a carry or overflow situation exists as a result of an addition or multiplication operation).

Architecturally, a flags register may be defined that stores the flags. Thus, the given register may update both a logical register and the flags register. It should be noted that not all instructions may update the one or more flags. Since the registers store both data results and flag results, situations may occur wherein the execution of an instruction updates the data results but not the flag results. As such, the data results may die (e.g. as the result of a subsequent instruction update) with the flag results still remaining valid. In such a case, a solution may be implemented to insure the preservation of a flags value in a physical register previously storing both a data value and flags value for which the data value is no longer valid due to a subsequent update to the same logical register being retired. Embodiments of such a solution will be discussed in further detail below in reference to FIGS. 2–5.

The register map 134 may assign a physical register to a particular logical register (e.g. architected register or microarchitecturally specified registers) specified as a destination operand for an operation. The dispatch unit 104 may determine that the register file 116 has a previously allocated physical register assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in the register file 116) through a load/store unit (not shown). Operand data values may be provided to the execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

As used herein, a scheduler is a device that detects when operations are ready for execution and issues ready operations to one or more execution units. For example, a reservation station is one type of scheduler. Independent reservation stations per execution core may be provided. A central reservation station from which operations are issued may be provided. In other embodiments, a central scheduler which retains the operations until retirement may be used. Each scheduler 118 may be capable of holding operation information (e.g., the operation as well as operand values, operand tags, and/or immediate data) for several pending operations awaiting issue to an execution core 34. In some embodiments, each scheduler 118 may not provide operand value storage. Instead, each scheduler may monitor issued operations and results available in the register file 116 in order to determine when operand values will be available to be read by the execution core(s) 124 (from the register file 116 or the result bus 130).

Register Renaming with Flag Preservation

Figure 2:
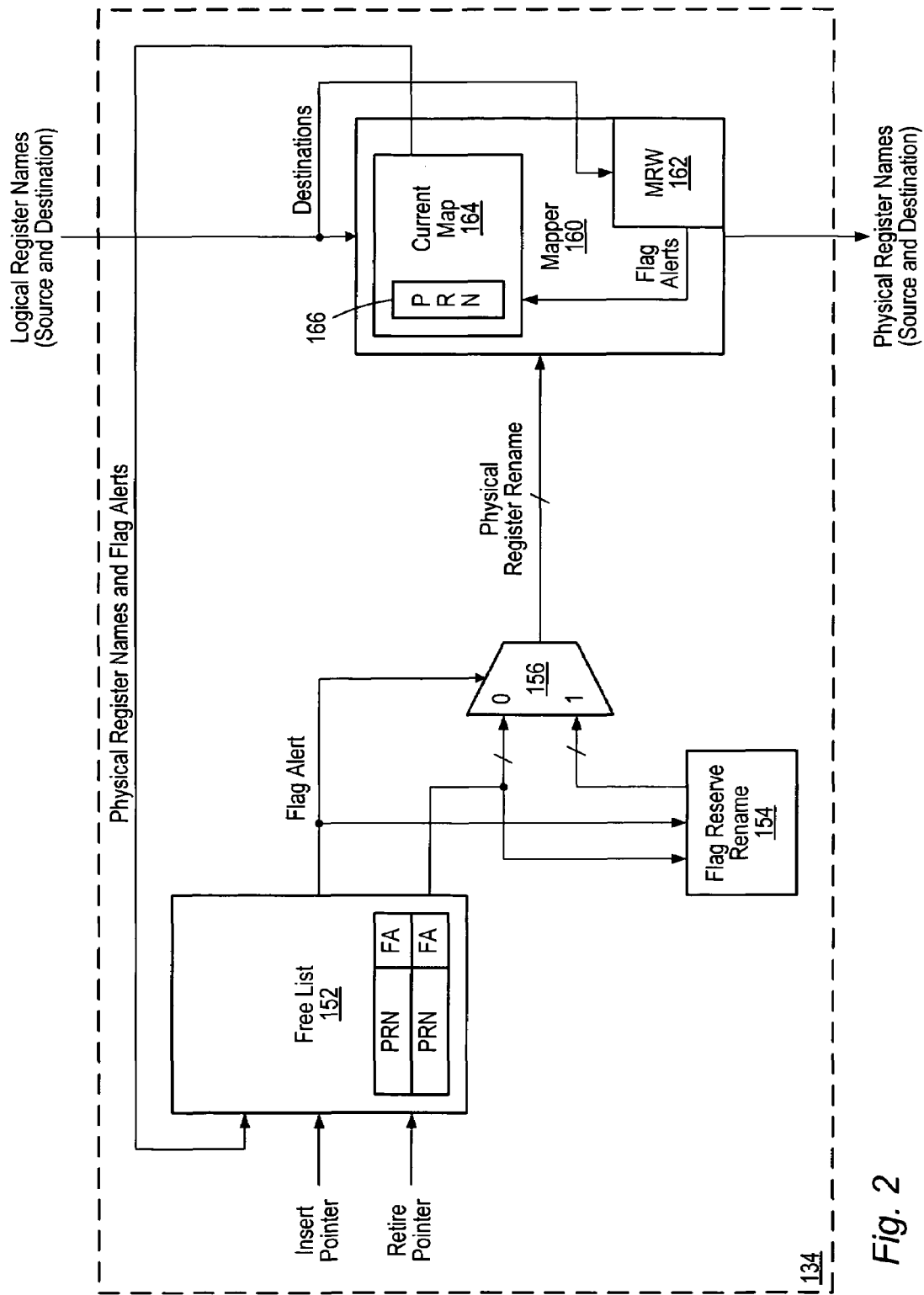
FIG. 2 is a block diagram of one embodiment of a register map.

Moving now to FIG. 2, a block diagram of one embodiment of register map 134 is shown. In the embodiment shown, register map 134 includes a first storage circuit (free list 152), a second storage circuit (flag reserve storage circuit 154), selection circuit 156, and mapper 160. Selection circuit 156 is coupled to receive a first physical register name from free list 152 and a second physical register name from flag reserve storage circuit 154. Selection circuit may provide one of the received physical register names to mapper 160 based on the state of a flag alert indication.

If the flag alert indication is in a first state, the first physical register name may be forwarded to mapper 160, while the second physical register name may be forwarded to mapper 160 if the flag alert indication is in a second state. If the second physical register name is forwarded to mapper 160 (as a result of the flag alert indication being in the second state), the first physical register name may be stored in flag reserve storage circuit 154, and may subsequently be used as a second physical register name in future instances where the flag alert indication is in the second state.

In the embodiment shown, free list 152 stores physical register names and their associated flag alert indications. The flag alert indication (e.g., a flag alert bit) may indicate that the data and flag values stored in a physical register that corresponds to a logical register were updated by an instruction and that a subsequent instruction updated the data value of the physical register without updating the flags (the "flag alert scenario"). In other words, an instruction was executed that updated both a logical register and a flag value, followed by the execution of a subsequent instruction which updated the same logical register without any corresponding updates of the flag values. The valid flag values may be preserved by swapping a physical register name for which the flag alert bit is set with another physical register name as the physical register names are forwarded to current map 160. The flag alert indication, when in a set state, may effect a swap operation to ensure preservation of the valid flag values. As noted above the flag alert indication may be implemented by a single bit. In one embodiment, the flag alert bit, when set, indicates detection of the flag alert scenario and indicates when clear, of no detection of the flag alert scenario. These embodiments will be used below as an example. However, other embodiments may reverse the meaning of the set and clear states or may use multi-bit indications.

The swap operation effected by the flag alert bit (when set) may result in selection circuit 156 selecting a physical register name from flag reserve storage circuit 154, which may be forwarded to mapper 160. When the swap operation occurs, the physical register name that is read from free list 152 may be written into flag reserve storage circuit 154 for later use. The flag alert bit of the physical register read from free list 152 may be used as a write enable input for flag reserve storage circuit 154 (which does not store the flag alert bit in the embodiment). In this manner, the physical register name read from free list 152 is prevented from being re-used, thus preserving the flag bits stored in the corresponding physical register for possible bus by the currently outstanding instructions.

A first physical register name in flag reserve storage circuit 154 is guaranteed to be free by the time it is needed for a swap due to the fact the flag alert bit may be set when an instruction updates the data results and flags of a physical register, followed by an instruction in which the data result is overwritten with no flag update. The first physical register may remain in flag reserve storage circuit 154 until a flag alert bit is set for a second physical register name output by free list 152 (thereby indicating that a subsequent flag alert scenario has occurred). In order for the insert pointer (which will be discussed in greater detail below) to progress to the location in free list 152 where the second physical register name is located, it may be required to pass the location corresponding to the flag update causing the subsequent flag alert scenario. In order for the insert pointer to pass that location, the retire pointer (which will also be discussed in further detail below) may also be required to have passed that location in free list 152. The passing of the retire pointer may guarantee that the subsequent flag update has been committed and thus the flags corresponding to the flag alert scenario are no longer valid.

Mapper 160 may be configured to provide physical register names and their associated flag alert indications to free list 152. In particular, mapper 160 may displace physical register names in current map 164 when newly provided physical register names are received from selection circuit 156. The physical register names that are displaced and returned to free list 152 may still represent valid flag values. Some of the returned physical register names may also be associated with a set flag alert indication, indicating the flag alert scenario described above. Detection of physical register name representing valid flag values may be performed by most recent writer circuitry 162, which will be described in further detail below.

At a system reset, both free list 152 and flag reserve storage 154 may be initialized with physical register names. It should be noted however that a physical register name that is stored in free list 152 may not be simultaneously stored in flag reserve storage circuit 154. Similarly, physical register names stored in current map 164 may not simultaneously be present in either free list 152 or flag reserve storage circuit 154. Mapper 160 may map each source logical register name to the corresponding physical register name from current map 164 (or to a physical register name assigned to a prior instruction that is currently being mapped). Mapper 160 may also assign physical register names received from selection circuit 156 to destination logical register names, and may update current map 164 accordingly.

In the embodiment shown, mapper 160 includes a current map 164 and most recent writer circuitry 162. Current map 164 is configured to store a set of physical register names (example physical register name 166 is shown here), each corresponding with one of the logical registers. Mapper 160 is coupled to receive logical register names that indicate both source and destination registers of one or more instructions to be dispatched. Source registers may be those logical registers that are currently storing an operand that is to be used as a source operand in a one of the instructions. Destination registers may be those logical registers that are to be used to store a result from an executed instruction. It should be noted that, for some instructions, a logical register may be both a source and a destination register.

In some embodiments, mapper 160 may receive logical register names for a sequence of instructions or operations. Such a sequence may be referred to as a trace. Results generated for instructions executed within a trace may be either slot results or logical register results. Slot results are those results that may be generated during the execution of the sequence of instructions but are subsequently overwritten by another instruction within the same sequence. In other words, any data value generated that is a slot result may die before the sequence (e.g., trace) completes execution. On the other hand, a logical register result is a result that does not die at the end of the sequence (or trace), and may be bound to an associated logical register (i.e. retired when the trace is). Physical register names provided to current map 164 corresponding to slot results may be immediately returned to free list 152. Also, physical register names that are not used may also be immediately returned. However, if a physical register name corresponds to a logical register result, it may be stored in current map 164 until the corresponding logical register is used as a destination register of a subsequent instruction. Once the logical register has been used as a destination register, its corresponding physical register name may be returned to free list 152. Current map 164 may also return flag alert indications to free list 152 along with their corresponding physical register names. It should be noted that the flag alert indication may also be generated in embodiments where instructions are not issued as part of a trace.

As noted above, mapper 160 may be coupled to receive logical register names associated with source and destination registers. Most recent writer circuitry 162 may receive destination logical register names, and may perform a compare operation to determine if any of the received destination logical register names matches the logical register name that is the destination register of a most recent instruction that also updates the flags (the "most recent writer"). If a received destination logical register name matches the logical register name of a most recent writer, most recent writer circuitry 162 may determine whether an instruction associated with the received destination logical register name updates one or more flags. If the instruction associated with the destination register name does not update the flags, the flag alert bit may be set. If the instruction does update the flags, the flag alert bit is not set.

If the name of the destination logical register does not match a register name of the most recent writer, most recent writer circuitry 162 may make a determination as to whether the instruction associated with the destination logical register name updates the flags. If the associated instruction does update the flags, most recent writer circuitry 162 may be updated to store the destination logical register name for the instruction associated with the flag updates. The stored logical register name may be used for future comparisons as described above.

In one embodiment, free list 152 may be a circular buffer. In the embodiment shown, free list 152 is coupled to receive both a retire pointer and an insert pointer. The insert pointer may point to a location in the free list where physical register names are to be outputted from (and thus provided to either mapper 160 or flag reserve storage circuit 154) and to which physical register names returned to free list 152 from mapper 160 are to be written. Since physical register names displaced from current map 164 are written into free list 152 at an entry indicated by the insert pointer, the insert pointer may not return to that entry until instructions corresponding to those physical register names have been retired. Therefore, by the time those same physical register names have been selected again, register results corresponding to a new mapping (that occurred between the time the physical register were written into the free list and the time that the insert pointer returns to them) may have been committed and thus those physical registers may be guaranteed to be free. The retire pointer may indicate a point at which results are no longer speculative, and may be used for recovery if the speculative execution of some instructions is found to be incorrect. Additionally, the retire pointer qualifies the flag alert indication by indicating which physical register names were displaced from current map 164 by retired instructions. If the retire pointer has not yet passed a physical register name in the free list that has the flag alert bit set, the flag alert scenario may not exist since the instruction which caused the flag alert scenario was not retired.

During operation of register map 134, both the insert pointer and the retire pointer may point at various locations in free list 152, progressing in a circular manner. The pointers may progress through the locations at different rates. However, the insert pointer may not pass the retire pointer, thereby preventing a situation where logical registers containing results from instructions that have not yet been retired are overwritten. This may ensure that any register names forwarded to mapper 160 are free at the time they are provided. In one embodiment, each entry in free list 152 may include a number of physical register names that corresponds to the number of instructions that may be part of a trace (e.g., 8 physical register names for a trace having 8 instructions).

It should be noted that flags may organized into groups of flags based on how they are updated by instructions. In some embodiments, a separate flag alert indication may be present for each flag/flag group. Such embodiments may include a separate selection circuit 156 and a separate flag reserve storage circuit 154 for each flag/flag group.

Figure 3:
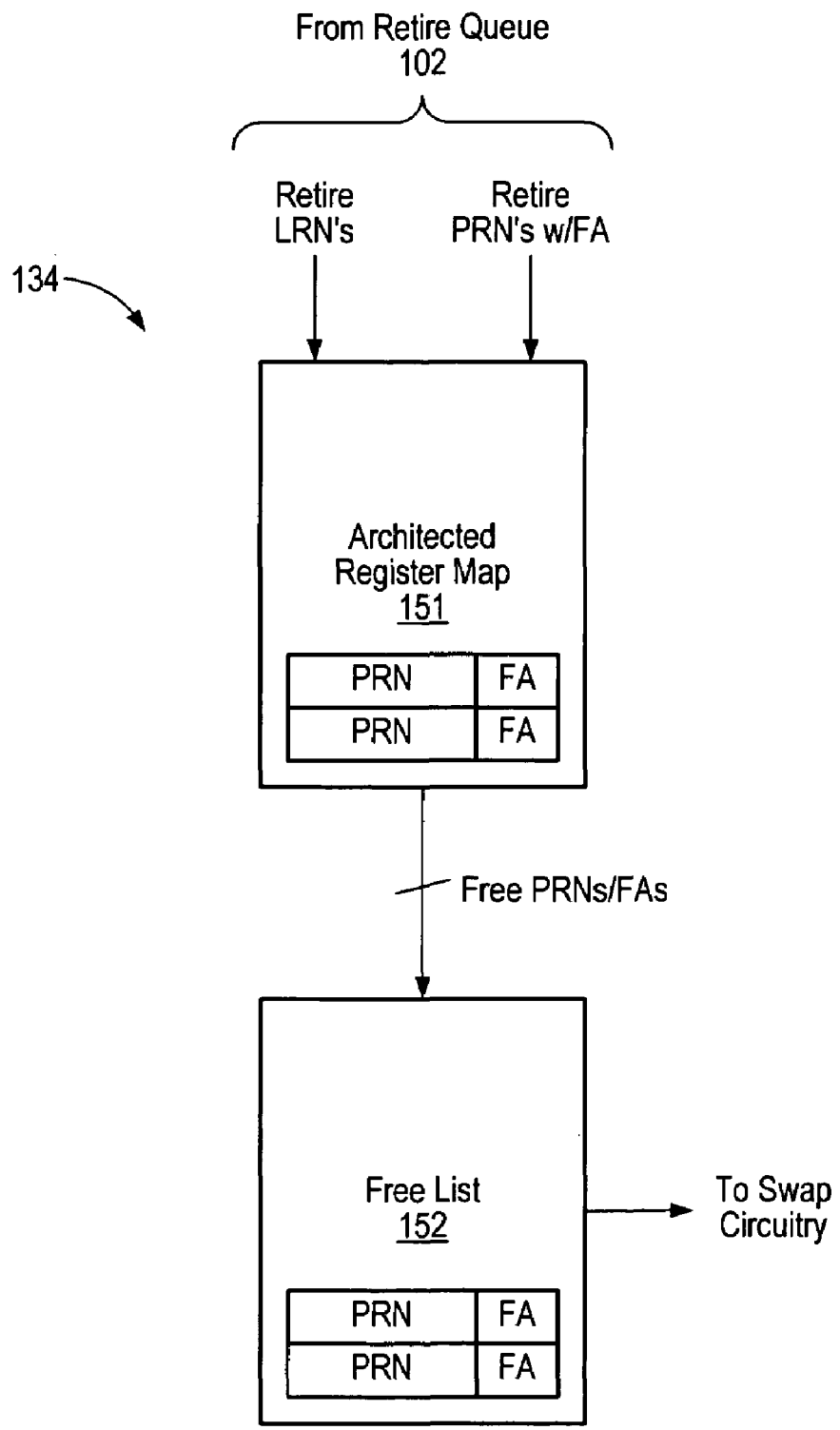
FIG. 3 is a block diagram of an alternate embodiment of register map circuit.

Moving now to FIG. 3, a block diagram of another embodiment of a portion register map 134 is shown. In the embodiment of FIG. 3, register map 134 includes architected register map 151 and free list 152. Architected register map 151 may receive logical register names corresponding to physical register names from a retire queue (e.g., retire queue 102 in FIG. 1). The received logical register names may correspond to instructions being retired. The architected register map 151 may store the committed (retired) state of the mappings from logical register names to physical register names. As new physical register names are retired for various logical register names, previously used physical register names may be removed from architected register map 151 and added to free list 152. In this particular embodiment, free list 152 includes only names of registers that are actually free at any given point in time. Flag alert bits may by propagated along with the physical register names from the retire queue (received from mapper 160) to architected register map 151 and finally to free list 152.

Although not explicitly shown here, the embodiment of register map 134 shown in FIG. 3 may include swap circuitry including a selection circuit and a flag reserve storage (e.g., similar to selection circuit 156 and flag reserve storage circuit 154 of FIG. 2). The swap circuitry may perform the substitution of a second physical for a first physical register in a manner similar to that as described above in reference to FIG. 2. A most recent writer circuit (similar to most recent writer circuitry 162 of FIG. 2) may also be included to facilitate the detection of a situation where it is necessary to set a flag alert indication.

Figure 4:
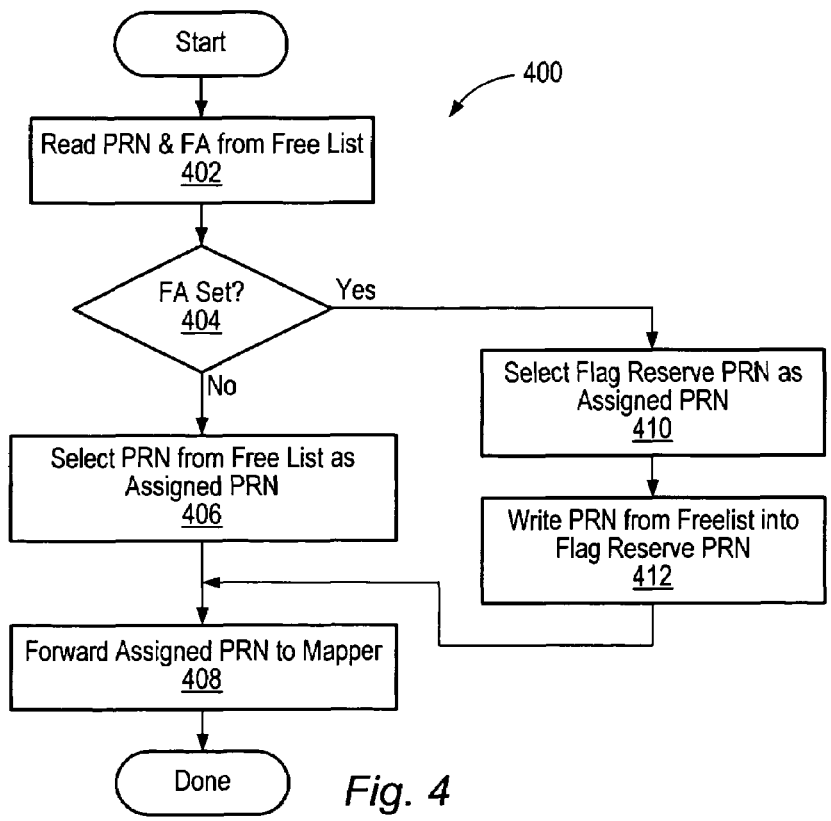
FIG. 4 is a flow diagram of one embodiment of a swap operation.

Turning now to FIG. 4, a flow diagram of one embodiment of swap operation 400 is shown. In swap operation 400, a physical register name and a flag alert bit may be read from a free list (402). The free list may be similar to free list 152 as discussed above. The flag alert bit may be set or clear. The state of the flag alert bit (404) may decide whether the physical register name is forwarded to a mapper or to flag reserve rename storage. If the flag alert bit is not set, a selection circuit may select the physical register name from the free list to be an assigned physical register name (406). Responsive to its selection, the assigned physical register name may be forwarded to the mapper (408), where the corresponding physical register may be mapped to a logical register.

If the flag alert indication is set, the selection circuit may select a physical register name stored in the flag reserve rename storage as the assigned physical register name (410). The physical register name provided by the free list may be written into the flag reserve rename storage for later use (412).

Figure 5:
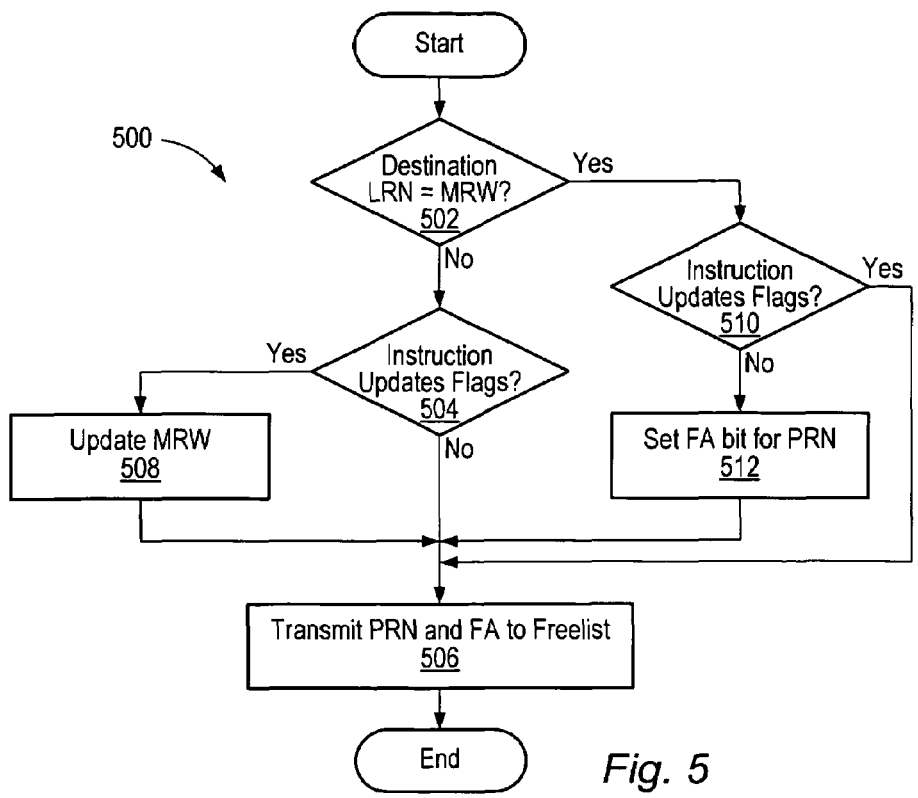
FIG. 5 is a flow diagram of one embodiment of a detect operation.

FIG. 5 is a flow diagram of one embodiment of detect operation 500. In detect operation 500, a comparison of a (destination) logical register name received by a mapper may be performed to determine if the received logical register name matches with a logical register name associated with the most recent update of one or more flags (502). In one embodiment, the mapper may be a circuit such as mapper 160, while the compare operation may be performed by most recent writer circuitry 162 (both shown above in FIG. 2). If the logical register name does not match the register name for which the most recent flag update was performed, a determination may be made as to whether an instruction associated with the logical register name updates the flags (504). If the associated instruction does update the flags, the most recent writer circuitry may be updated by storing the destination logical register name for the instruction (508). In either case, the physical register name displaced from the current map (e.g., current map 164 discussed above) and its associated flag alert bit in the clear state may be returned to the free list.

If the logical register name of the destination register does match the logical register name associated with the most recent flag update, a determination may be made as to whether the instruction associated with the named logical register updates the flags (510). If the associated instruction does not update the flags, the flag alert bit may be set for the displaced physical register name (512). Otherwise, the flag alert bit is clear. Regardless of whether or not the associated instruction updates the flags, the physical register name and its associated flag alert bit may be returned to the free list when the mapper is ready to map newly received physical register names.

Computer Systems

Figure 6:
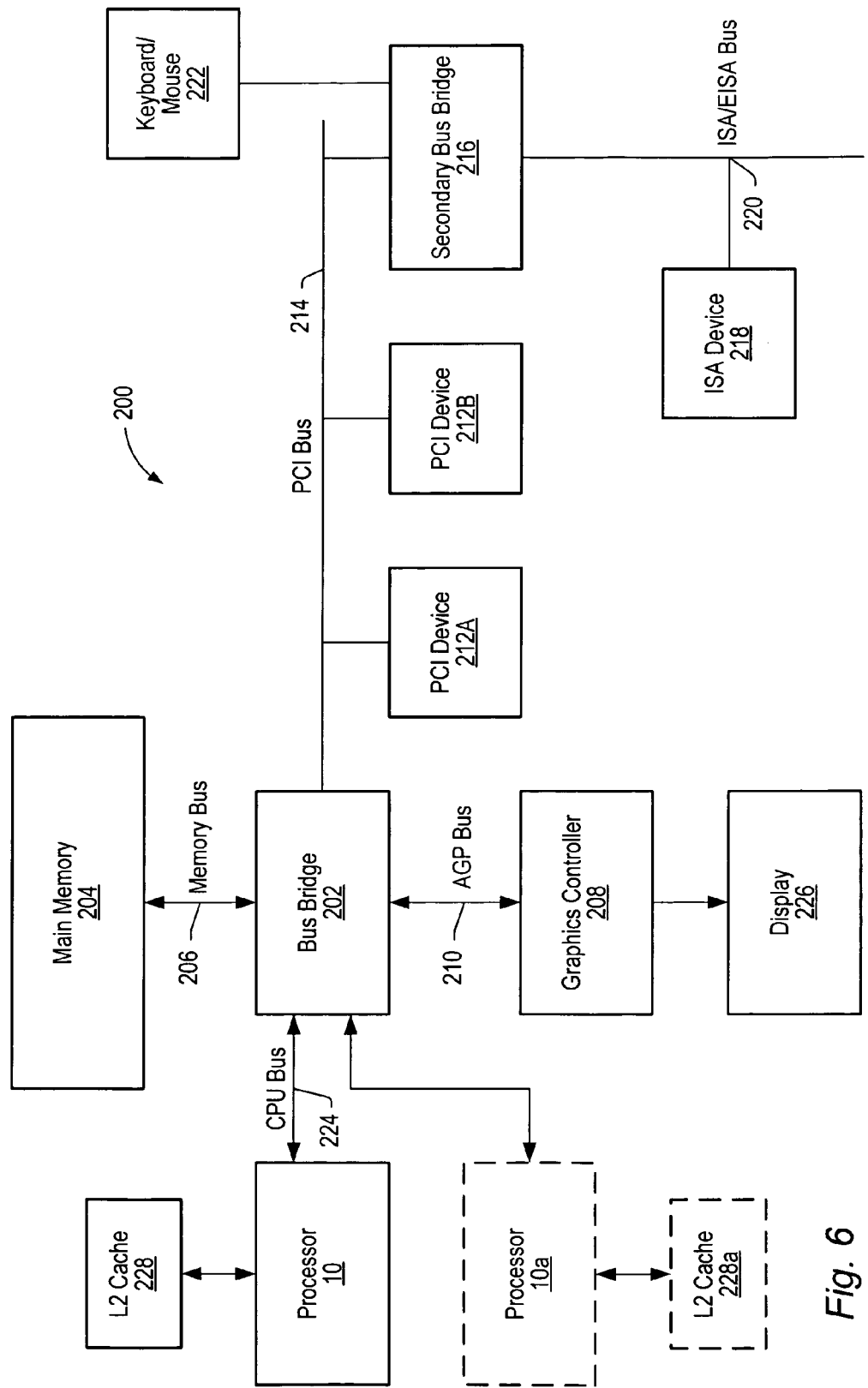
FIG. 6 is a block diagram of a computer system.

Turning now to FIG. 6, a block diagram of one embodiment of a computer system 200 including processor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple. The processor 10 may be the processor 10 shown in FIG. 1, and may include the details shown in the other figures and discussed above.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable. Main memory 204 may include the system memory 42 shown in FIG. 1.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus or may share CPU bus 224 with processor 10. Furthermore, processor 10a may be coupled to an optional L2 cache 228a similar to L2 cache 228.

Figure 7:
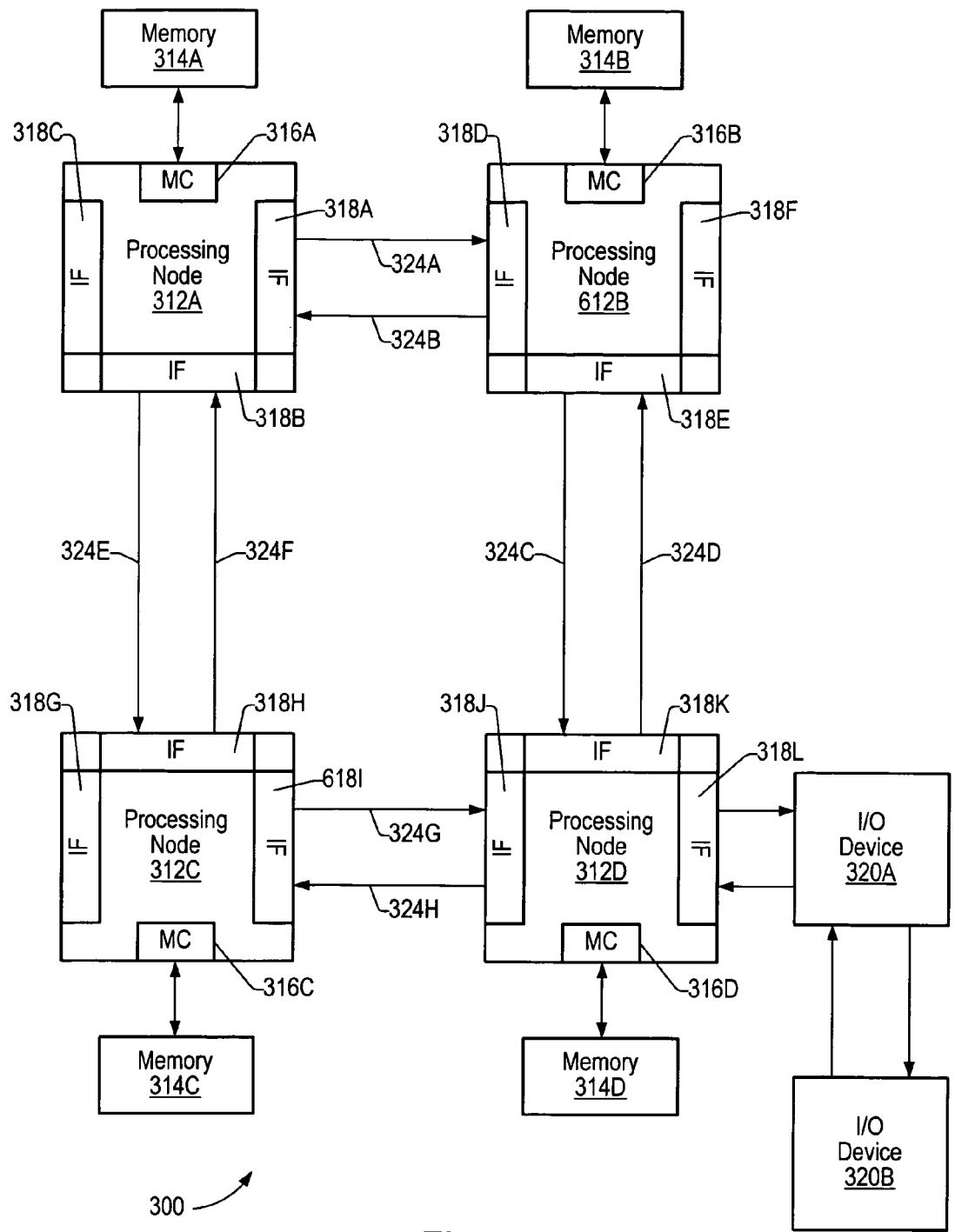
FIG. 7 is a block diagram of an alternate embodiment of a computer system.

Turning now to FIG. 7, another embodiment of a computer system 300 is shown. In the embodiment of FIG. 7, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 7. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 7. Any suitable routing algorithm may be used. Other embodiments of computer system 300 may include more or fewer processing nodes then the embodiment shown in FIG. 7.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 100 as shown in FIG. 1 (e.g. including various details shown in FIGS. 2 and/or 3). External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), DDR SDRAM, static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor comprising:
a first storage circuit comprising a free list, the free list including a set of physical register names and a corresponding set of indications each associated with one of the physical register names, wherein each indication is indicative, in a first state, that: (i) a physical register associated with a corresponding physical register name was assigned to store a register result and to store a flag result of a first instruction, and (ii) a subsequent instruction overwrites a logical register corresponding to a register result of the first instruction but not the flag result, and wherein each indication is indicative, in a second state, that at least one of (i) or (ii) is not detected, and wherein the first storage circuit is configured to output at least a first physical register name and a first indication corresponding to the first physical register name;

a second storage circuit configured to store one or more physical register names separate from the free list, wherein the second storage circuit is configured to output a second physical register name; and a selection circuit coupled to receive the first physical register name from the first storage circuit and the second physical register name from the second storage circuit and further configured to receive the first indication, wherein the selection circuit selects the first physical register name as a selected physical register name responsive to the first indication being in the first state and selects the second physical register name as the selected physical register name responsive to the first indication being in the second state;

wherein the selected physical register name is provided to a mapper circuit for assignment to a logical register.

2. The processor as recited in claim 1, wherein the mapper circuit includes most recent writer circuitry configured to store a name of a most recently written logical register name that was a destination of a most recent instruction which also updated the flags, wherein the most recent writer circuitry is coupled to receive one or more destination logical register names corresponding to instructions being presented to the mapper circuitry, and wherein the most recent writer circuitry is configured to determine if one of the destination logical register names is equivalent to a most recently written logical register name.

3. The processor as recited in claim 2, wherein the mapper circuit includes a current map which indicates a correspondence between physical register names and logical register names, wherein the most recent writer circuitry is further configured to provide an indication to the current map if the destination logical register name is equivalent to the most recently written logical register name and a corresponding instruction does not update flag results.

4. The processor as recited in claim 3, wherein the current map is coupled to receive physical register names from the selection circuit and is configured to return physical register names to the free list for physical registers that have been removed from the current map by subsequent assignments of physical register names.

5. The processor as recited in claim 1, wherein the first physical register name is stored in the second storage circuit if the first indication is in the second state.

6. The processor as recited in claim 1, wherein the free list is a circular buffer, wherein an insert pointer points to a first address in the free list.

7. The processor as recited in claim 6, wherein physical register names are inserted into the free list beginning at the insert pointer.

8. The processor as recited in claim 6, wherein physical register names are read from the free list beginning at the insert pointer.

9. A method for operating a processor, the method comprising:
storing a set of physical register names in a free list;
storing a corresponding set of indications in the free list, each indication associated with one of the physical register names in the free list;
wherein each indication is indicative, in a first state, that, (i) a physical register associated with a corresponding physical register name was assigned to store a register result and to store a flag result of a first instruction, and (ii) a subsequent instruction overwrites a logical register corresponding to a register result but not the flag result, and wherein each indication is indicative, in a second state, that at least one of (i) or (ii) is not detected;
outputting at least a first physical register name and a first indication corresponding to the first physical register name from the free list;
storing one or more physical register names separate from the free list;
outputting a second physical register name of the one or more physical register names;
selecting the first physical register name as a selected physical register name responsive to the first indication being in the first state;
selecting the second physical register name as the selected physical register name responsive to the first indication being in the second state; and
providing the selected physical register name for assignment to a logical register.

10. The method as recited in claim 9 further comprising receiving one or more destination logical register names, storing a most recently written logical register name that was a destination of a most recent instruction which also updated the flags, and determining if one of the one or more destination logical register names is equivalent to the most recently written logical register name.

11. The method as recited in claim 10, further comprising providing an indication if one of the one or more destination logical register names is equivalent to the most recently written logical register name and an instruction corresponding to the one of the one or more destination logical register names does not update flag results.

12. The method as recited in claim 11 further comprising indicating a correspondence between physical register names and logical register names.

13. The method as recited in claim 9 further comprising storing the first physical name separate from the free list if the first indication is in the second state.

14. The method as recited in claim 9 further comprising an insert pointer pointing to a first address in the free list.

15. The method as recited in claim 14 further comprising inserting physical register names into the free list at the first address.

16. The method as recited in claim 14 further comprising reading physical register names from the free list at the first address.

* * * * *